US007861244B2

(12) United States Patent  
Vasile

(10) Patent No.: US 7,861,244 B2
(45) Date of Patent: Dec. 28, 2010

(54) REMOTE PERFORMANCE MONITOR IN A VIRTUAL DATA CENTER COMPLEX

(75) Inventor: Phil Vasile, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1412 days.

(21) Appl. No.: 11/303,826

(22) Filed: Dec. 15, 2005

(65) Prior Publication Data

US 2007/0143753 A1  Jun. 21, 2007

(51) Int. Cl.
G06F 9/455 (2006.01)
(52) U.S. Cl. ........................................................ 718/1
(58) Field of Classification Search .................. 718/1
See application file for complete search history.

(56) References Cited

U.S. PATENT DOCUMENTS

| 5,881,284 | A  | * | 3/1999  | Kubo ............................ 718/100 |
| 6,282,568 | B1 |   | 8/2001  | Sondur |
| 6,496,847 | B1 |   | 12/2002 | Bugnion et al. |
| 6,802,054 | B2 |   | 10/2004 | Faraj |
| 6,985,946 | B1 | * | 1/2006  | Vasandani et al. ............ 709/225 |
| 2002/0135611 | A1 |   | 9/2002  | Deosaran et al. |
| 2003/0097393 | A1 | * | 5/2003  | Kawamoto et al. .............. 709/1 |
| 2004/0060057 | A1 | * | 3/2004  | Hansen et al. ............... 719/328 |
| 2004/0230970 | A1 |   | 11/2004 | Janzen |
| 2006/0031633 | A1 | * | 2/2006  | Zohar et al. .................. 711/113 |
| 2007/0094367 | A1 | * | 4/2007  | Esfahany et al. ............. 709/223 |

FOREIGN PATENT DOCUMENTS

WO  2004104825 A  12/2004

WO  2005107402 A  11/2005

OTHER PUBLICATIONS

Kinshuk Govil et al., "Cellular Disco: Resource Management Using Virtual Clusters on Shared-Memory Multiprocessors", ACM, SOSP-17, Dec. 1999, Kiawah Island, SC, pp. 154-169.

Emin Gün Sirer et al., "Design and Implementation of a Distributed Virtual Machine for Networked Computers", ACM, SOSP-17, Dec. 1999, Kiawah Island, SC, pp. 202-216.

Cheng Liao et al., "Monitoring Shared Virtual Memory Performance on a Myrinet-Based PC Cluster", ACM, ICS 98 Melbourne Australia, 1998, pp. 251-258.

(Continued)

*Primary Examiner*—Li B Zhen
*Assistant Examiner*—Blake Kumabe
(74) *Attorney, Agent, or Firm*—Toler Law Group

(57) ABSTRACT

Performance data is received at a Remote Performance Monitor (RPM) Server residing on a target virtual operating system within a virtual data center complex. The performance data is generated, and served at predefined intervals, by a Central Performance Data Server operable for the virtual operating system within the virtual data center complex. At least a portion of the performance data is saved in memory accessible to the RPM Server. Then, responsive to a request form an RPM Client residing on an originating virtual machine within the virtual data center complex, at least a portion of data residing in the memory is extracted by the RPM Server and served to the RPM Client.

45 Claims, 8 Drawing Sheets

OTHER PUBLICATIONS

Andrew Whitaker et al., "Scale and Performance in the Denali Isolation Kernel", USENIX Association, 5$^{th}$ Symposium on Operating Systems Design and Implementation, pp. 195-209, 2002.

Tal Garfinkel et al., "Terra: A Virtual Machine-Based Platform for Trusted Computing", ACM, SOSP '03, Oct. 19-22, 2003, Bolton Landing, New York, USA, pp. 193-206.

E. Richter, "LS2-Software Monitoring and Control System for SVL (Operating System)", Rechentechnik Datenverarbeitung, vol. 26, No. 3, Mar. 1989, Abstract Only.

R. Paans, "Evaluating Performance of MVS Systems", Informatie, vol. 25, No. 10, Oct. 1983, Abstract Only.

* cited by examiner

REMOTE PERFORMANCE MONITOR IN A VIRTUAL DATA CENTER COMPLEX

FIELD OF INVENTION

The present invention relates to monitoring the resources of computer systems. More specifically, the present invention relates to a method, computer program product and system for remotely monitoring the performance of a virtual operating system within a virtual data center complex.

BACKGROUND

Virtual machines are known in the prior art. In general, a virtual machine appears to be a real physical computer system to a computer user, or to a program developed to run on a computer system. However, the virtual machine is not constrained to the physical specifications of the computer hosting the virtual machine; but rather the virtual machine is logical in nature with computing resources (e.g. virtual memory) that are determined by the system administrator responsible for defining the virtual machine.

Accordingly, a great deal of flexibility exists for the system administrator whereby the physical resources of a computing system are utilized more efficiently by defining virtual operating systems that are appropriately structured for the specific workloads of the owning enterprise. To this end, a single physical machine may host one or more virtual operating systems, each virtual operating system comprising one or more virtual machines.

A virtual machine has the further functionality of hosting a real operating system. That is, a single virtual machine may host a guest operating system creating the illusion that an operating system is running on its own physical computer. This is a very powerful concept in that it facilitates efficient software testing.

For example, several dozen departments may be concurrently testing different software products, each in the early stages of development with a high potential of encountering serious errors which would disable an entire operating system. If all of these departments were running on a single real system, each disabling error for one software product may bring testing to a screeching halt for all other software products being tested on the system.

In the virtual world, a disabling error brings down only the guest operating system running the failing software product. All other software testing proceeds, as they each are running on their own unique guest operating system running under a unique virtual machine.

In order to further increase the efficiency of computing systems additional flexibility evolved over time whereby a plurality of virtual machines spanning one or more virtual operating systems running on one or more physical computing systems could be defined. This facilitated an easy migration to additional computing power as the work load of an enterprise increased over time. Such a network of virtual machines is herein defined as a "virtual data center complex"

It is apparent, with a plurality of virtual machines defined over a plurality of physical computing systems, that a sophisticated performance monitoring capability will be required in order for the system administrators to properly tune the virtual data center complex on an ongoing basis. Various performance monitor programs catering to the needs of the system administrator are known in the prior art, such as IBM's® product shipped with IBM's Virtual Machine (VM) operating system.

However, virtual machine performance monitor products in the prior art are deficient in that they cater to the needs of the system administrator. As testing work loads have increased in large software development enterprises, it has become increasingly important that users of the virtual machines also have some performance monitoring capability. In this way, the general user (i.e. not the system administrator responsible for the overall operation of the virtual complex) has necessary tools to ensure the timely execution of his or her individual projects.

For example, with adequate and timely knowledge of one virtual operating system's performance, a user may decide to target a different virtual operating system for a given work load, thereby expediting his or her individual project, as well as helping to balance the overall workload by choosing a virtual operating system with greater availability of computing resources.

Furthermore, the general user may discover that there are performance issues or problems with a given software product by detecting the change in a virtual operating system's performance statistics attendant with the execution of the project software. Further still, by capturing performance screens during project execution, the general user may accumulate helpful documentation to share with the system administrator in those cases where the virtual data center complex is not tuned in an optimal manner for the enterprise.

Another shortcoming with prior art virtual machine performance monitors is that they are very restrictive with respect to receiving performance information only from previously predetermined systems. For example, if a user or administrator is currently logged on to one virtual machine residing on one physical processor, it may be necessary to logon to a second virtual machine on a different physical processor in order to gain access to the required performance information. This process of logging off of one virtual machine and logging on to a second virtual machine in order to obtain performance information is very inconvenient and impacts the productivity of users and administrators.

Accordingly, there is a great need for an enhanced remote performance monitor operable within a virtual data center complex that can facilitate the retrieval of remote performance information by the general user in a manner that is convenient, efficient, and does not jeopardize the security and integrity of the virtual data center complex.

SUMMARY OF THE INVENTION

To overcome these limitations in the prior art briefly described supra, the present invention provides a method, computer program product and system for remotely monitoring the performance of a target virtual operating system within a virtual data center complex.

In one embodiment a method is described wherein performance data is received at a Remote Performance Monitor (hereinafter RPM) Server residing on a target virtual operating system within a virtual data center complex. The performance data is generated, and served at predefined intervals, by a Central Performance Data Server operable for the virtual operating system.

At least a portion of the performance data is saved in memory accessible to the RPM Server. Then, responsive to a request from an RPM Client residing in an originating virtual machine within the virtual data center complex, at least a portion of data residing in the memory is extracted by the RPM Server and served to the RPM Client.

In another embodiment, the method may further comprise generating a screen from the extracted portion of performance data and displaying the screen to a user logged on to the originating virtual machine. In still another embodiment, authorization checking is performed and, depending upon the authorization status of the user, an authorization error is returned to the user. In another embodiment still, the user may logon to a different virtual machine and retain the capability to retrieve the same performance data as the original virtual machine.

A system of the present invention is also presented for remotely monitoring the performance of a target virtual operating system within a virtual data center complex. The system may be embodied in software running on a single computing device or on a plurality of computing devices. The system in the disclosed embodiments substantially includes the modules and structures necessary to carry out the functions presented above with respect to the described method. More particularly, the system, in one embodiment, comprises a computing device, an RPM Client, an RPM Server and a Central Performance Data Server.

A signal bearing medium tangibly embodying a program of machine-readable instructions (or alternatively "program code") executable by a digital processing apparatus to perform operations to remotely monitor the performance of a target virtual operating system within a virtual data center complex. The operation of the program substantially comprises the same functions as described above with respect to the described method. More particularly, the operation of the program comprises execution of an RPM Client, an RPM Server and a Central Performance Data Server.

References throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One of ordinary skill in the relevant art will recognize that the invention may be practiced without one or more of the specific features or advantages of a particular embodiment. In other instances, additional features and advantages may be recognized in certain embodiments that may not be present in all embodiments of the invention.

The above summary of the invention is provided to facilitate a basic, high level understanding of the invention to enable the reader to appreciate some of the advantages attainable from the novel remote performance monitor briefly described above, accessible to a general user from any virtual machine within a virtual data center complex. However, for a better understanding of the invention and its advantages, reference should be made to the accompanying descriptive matter, together with the corresponding drawings which form a further part hereof, in which there is described and illustrated specific examples accordance with the present invention. Various advantages and features of novelty, which characterize the present invention, are pointed out with particularity in the claims annexed hereto and form a part hereof.

BRIEF DESCRIPTION OF THE DRAWINGS

The present invention is described in conjunction with the appended drawings, where like reference numbers denote the same element throughout the set of drawings.

DETAILED DESCRIPTION

The present invention overcomes the limitations discussed supra associated with the related art by teaching a method, system and computer program product for remotely monitoring the performance of a virtual operating system within a virtual machine data center complex.

Those of ordinary skill in the art will recognize, however, that the teaching contained herein may be applied to embodiments and variations not shown and that the present invention may be practiced apart from the specific details taught herein. Accordingly, the present invention should not be limited to the embodiments shown but is to be accorded the widest scope consistent with the principles and features described herein. The following description is presented to enable one of ordinary skill in the art to make and use the present invention and is provided in the contest of a patent application and its attendant requirements.

References throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally, the novel methods disclosed herein may be tangibly embodied in and/or readable from a computer-readable medium containing the program code (or alternatively, computer instructions), which when read and executed by a computer system causes the computer system to perform the steps necessary to implement and/or use the present invention. Thus, the present invention may be implemented as a method, a system, or an article of manufacture using standard programming and/or engineering techniques to produce software, firmware, hardware, or any combination thereof. The term "article of manufacture" (or alternatively, "computer program product") as used herein is intended to encompass any computer-readable device, carrier, or media from which the computer instructions are accessible. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 1:
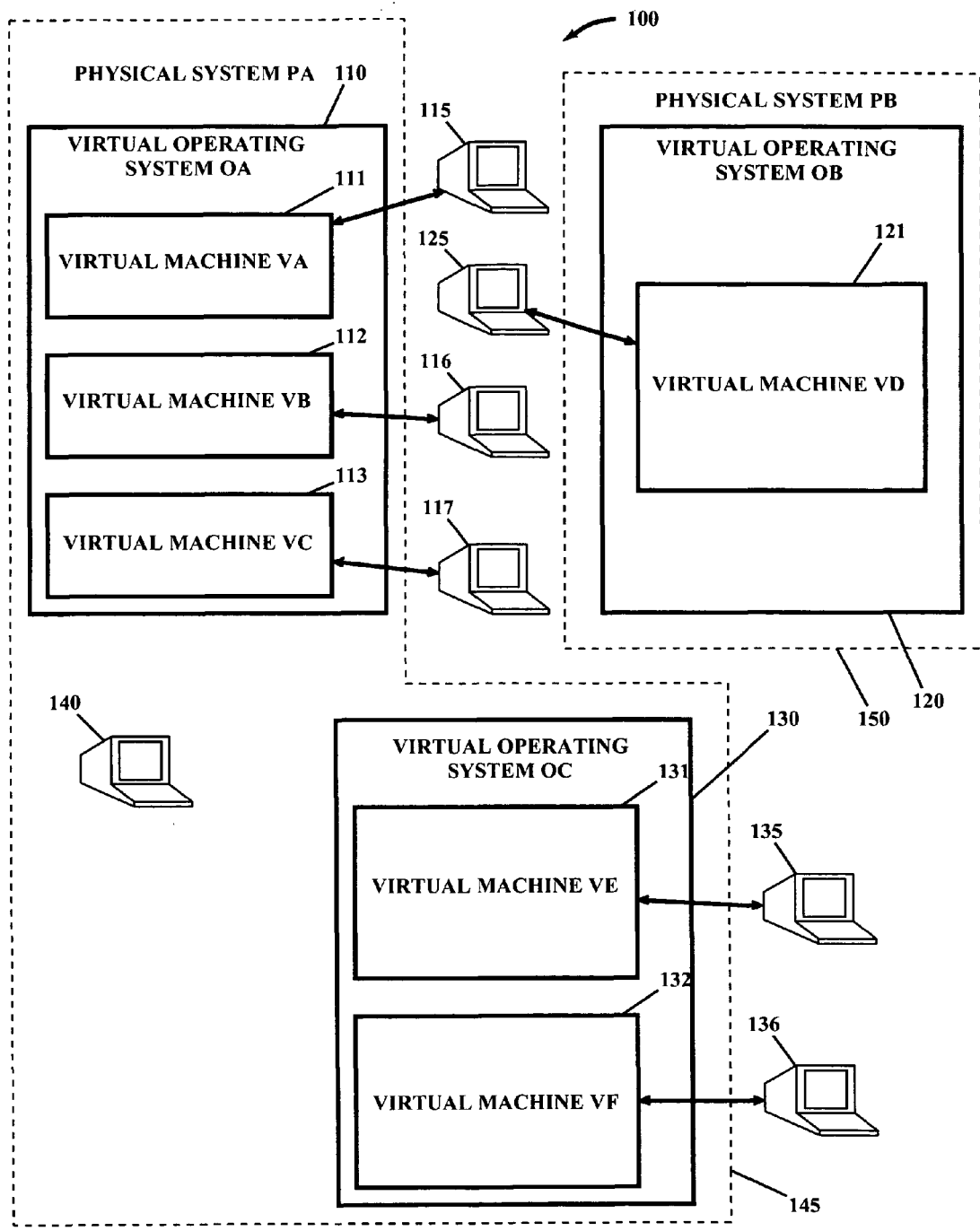
FIG. 1 is a block diagram of an exemplary prior art virtual data center complex wherein the present invention may be practiced.

Referring now to FIG. 1, a block diagram of a virtual data center complex is shown suitable for practicing the present invention. Virtual data center complex 100 comprises physical system PA 145 physical system PB 150. Typically physical systems 145 and 150 are mainframe systems, such as the zSeries mainframe computer system. (zSeries is a trademark of International Business Machines Corporation in the United States, other countries, or both.) However, those of ordinary skill in the art will recognize that the reference to zSeries is exemplary and that the teachings contained herein are applicable to any physical computing systems.

Physical system PA 145 comprises virtual operating system OA 110 and virtual operating system OC 130. Virtual operating system OA 110 comprises virtual machine VA 111, virtual machine VB 112 and virtual machine VC 113. Virtual operating system OC 130 comprises virtual machine VE 131 and virtual machine VF 132. Physical system PB 150 comprises virtual operating system OB 120. Virtual operating system OB 120 comprises virtual machine VD 121;

Those of ordinary skill in the art will recognize that the configuration represented in FIG. 1 is exemplary in nature and that an unlimited number of other configurations illustrating a plurality of processors, a plurality of virtual operating systems and a plurality of virtual machines is possible.

Also illustrated in FIG. 1 are virtual machine users 115, 116, 117, 125, 135 and 136. While a particular virtual machine user may be logged onto a specific virtual machine, the user may have an interest in any number of other virtual machines or virtual operating systems within virtual data center complex 100. For example, user 135 is currently logged on to virtual machine VE 131; however user 135 may have scheduled one or more jobs to run on virtual machine VD 121. Accordingly, user 135 may have an interest in viewing information related to the performance of virtual operating system OB 120 as well as virtual operating system OC 130.

User 140 is designated as a "system user" in FIG. 1. A system user refers to a user with special privileges to view and change system information within virtual data center complex 100 that is not available to the general user. The system user has special skills and training to understand complex performance data and make appropriate tuning adjustments to enhance the overall virtual data center complex performance. System user 140, as shown, is not currently logged on to any virtual machine, but typically would have access to virtual operating systems 110, 120 and 130.

Figure 2:
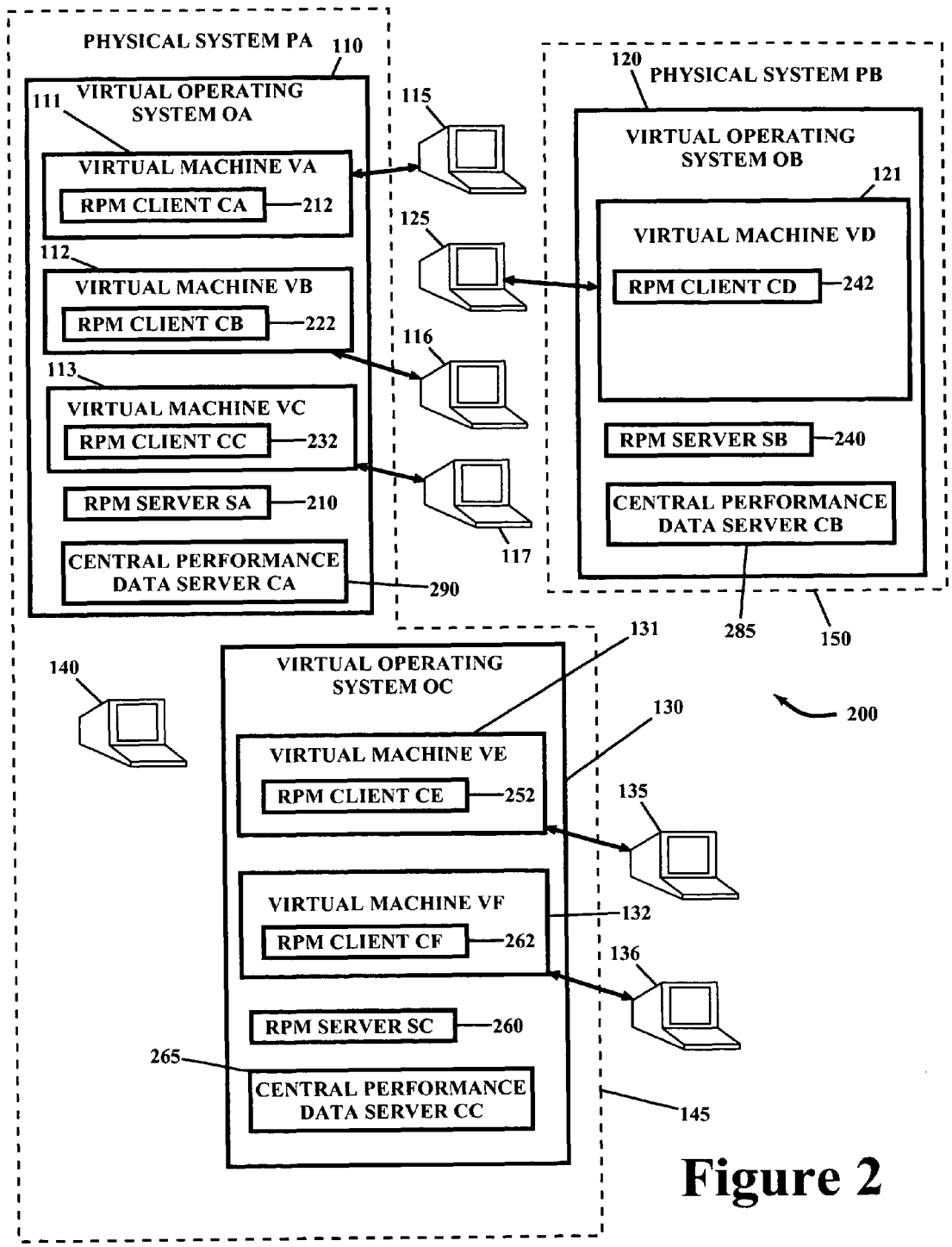
FIG. 2 is a block diagram illustrating an exemplary Remote Performance Monitor in accordance with the present invention.

Referring now to FIG. 2, the block diagram of FIG. 1 is further expanded to show additional components in accordance with the present invention. Virtual operating system OA 110 comprises RPM Server SA 210 and Central Performance Data Server CA 290. Virtual operating system OB 120 comprises RPM Server SB 240 and Central Performance Data Server CB 285; and virtual operating system OC 130 comprises RPM Server SC 260 and Central Performance Data Server CC 265.

Virtual machine VA 111 comprises software component RPM Client CA 212. In like manner, RPM Clients 222, 232, 242, 252 and 262 are shown for virtual machines 112, 113, 121, 131 and 132, respectively.

In accordance with the present invention, any RPM Client can communicate with any RPM Server within virtual data center complex 200; and, any RPM Server can communicate with any RPM Client within virtual data center complex 200. These communication links are not shown for simplicity, but are assumed to be present in accordance with the above statement.

In accordance with the present invention, each of Central Performance Data Servers 290, 285 and 265 may communicate with RPM Server 210, 240 and 260, respectively; and each of RPM Servers 210, 240 and 260 may communicate with Central Performance Data Server 290, 285, and 265, respectively. These communication links are not shown for simplicity, but are assumed to be present in accordance with the above statement.

Figure 3:
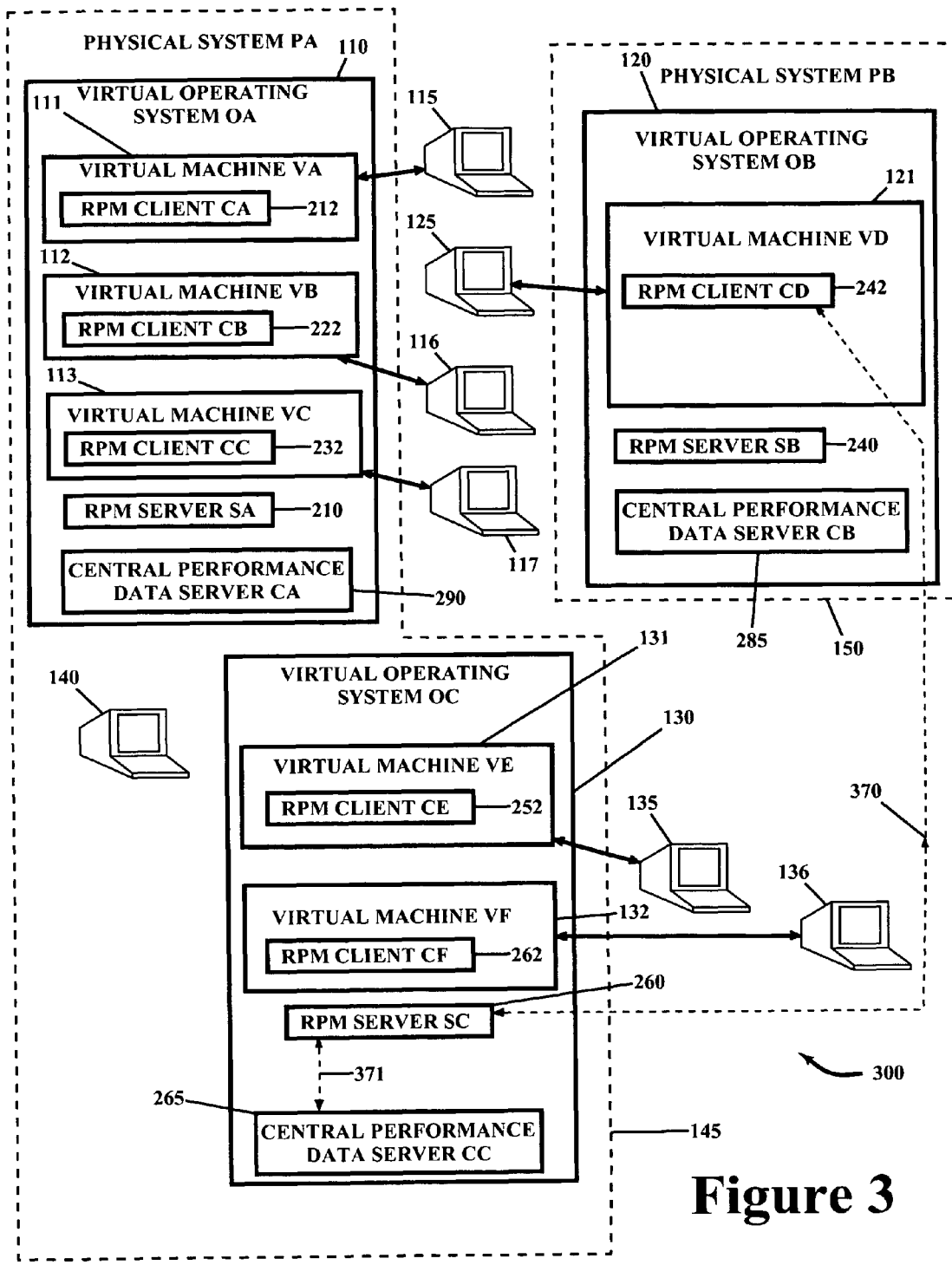
FIG. 3 is a block diagram illustrating an exemplary performance screen request.

Referring now to FIG. 3, the block diagram of FIG. 2 is further expanded to illustrate a specific example of a user logged onto one virtual machine requesting performance information pertaining to a different target virtual operating system residing on a different physical machine. User 125 is logged onto virtual machine VD 121 and requests performance information pertaining to virtual operating system OC 130. For this example virtual machine VD 121 is referred to as the originating virtual machine and virtual operating system OC 130 is referred to as the target virtual operating system.

The following table illustrates, in a preferred embodiment, some exemplary types of performance information that a general user or authorized user may display by requesting a particular performance screen from an RPM client:

| Screen Name | Class | Description |
| --- | --- | --- |
| DEVices | General/ Authorized | Displays devices (typically DASD) in descending order by response times. If address is specified, display details for that device. Using address is an authorized function. |
| LPARs | General | Displays all LPARs defined on the physical hardware the target system is running on. (See LPAR definition below.) |
| MAIN | General | Displays general system statistics, top users of resources, and worst case device by response time. |
| MEMory or STORage | General | Displays statistics regarding the VM system's main memory and expanded storage. |
| MENU or HELP | General | Displays general help information, valid commands, and screens |
| SYStem | General | Display general system statistics |
| USERs | General/ Authorized | Displays users in order by CPU resource consumption. If userid is specified, that user's detailed statistics are displayed. |
| CTLUNIT | Authorized | Displays control unit information |
| MDCACHE | Authorized | Displays statistics regarding MDC caching |
| DASDLOG | Authorized | Displays a log of statistics regarding DASD devices |
| PAGELOG | Authorized | Displays a log of statistics regarding paging information |
| UPAGE | Authorized | Displays users doing inordinate amounts of paging by WSS |
| CHANNEL | General | Displays statistics regarding the system's channels |

In a preferred embodiment, various performance screens may be requested in accordance with a user's authorization level as depicted under the column "Class" above. A designation under the class of "General/Authorized" means that a performance screen is available to the general user, however, various sub-options may be specified that would require a level of appropriate authorization before honoring the request.

Responsive to user 125 initiating a request, RPM Client CD 242 receives control and initiates communication 370, whereby RPM Server SC 260 receives control. Responsive to this communication, RPM Server SC 260 retrieves requested performance data from memory accessible to RPM Server SC 260 and returns the requested data over communication link 370 to RPM Client CD 242. RPM Client CD 242 then displays this data to user 125.

At predetermined intervals, explained in greater detail infra, RPM Server SC 260 initiates communication 371, whereby Central Performance Data Server 265 receives control. Responsive to this communication, Central Performance Data Server 265 generates the requested performance data and returns the requested data over communication link 371 to RPM Server SC 260. RPM Server SC 260 retains this performance data in accessible memory to satisfy future requests from any RPM Client within virtual data center complex 300.

In a preferred embodiment, Central Performance Data Server 265 may be an existing performance server component of a virtual data center complex known in the prior art as "FCON".

Figure 4:
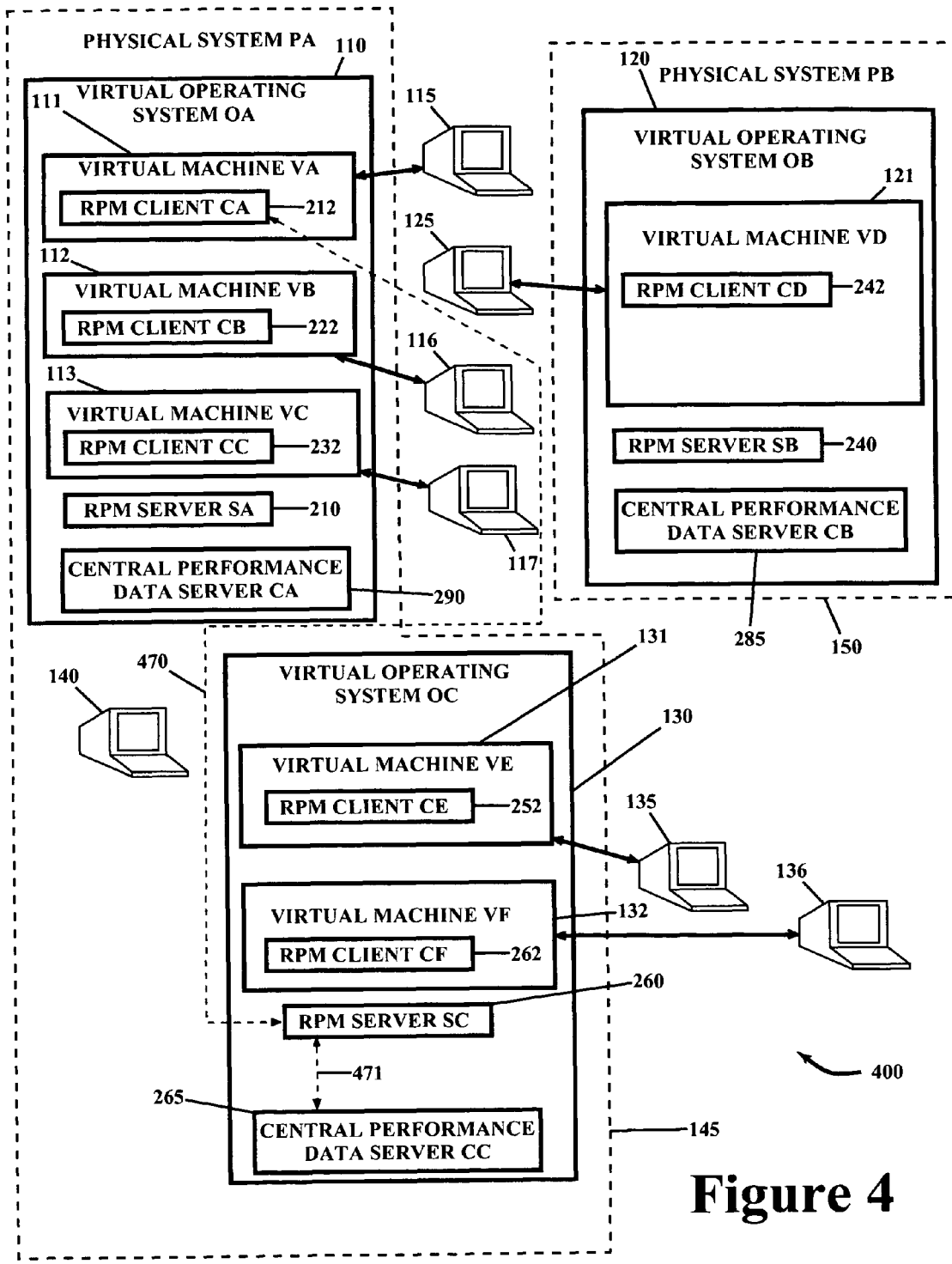
FIG. 4 is a block diagram illustrating a second exemplary performance screen request.

Referring now to FIG. 4, the block diagram of FIG. 2 is further expanded to illustrate a specific example of a user logged onto one virtual machine requesting performance information pertaining to a different target virtual operating system, but residing on the same physical machine. User 115 is logged onto virtual machine VA 111 and requests performance information pertaining to virtual operating system OC 130. For this example VA 111 is referred to as the originating virtual machine and virtual operating system OC 130 is referred to as the target virtual operating system.

Responsive to user 115 initiating this request for performance information, RPM Client CA 212 receives control and initiates communication 470, whereby RPM Server SC 260 receives control. Responsive to this communication, RPM Server SC 260 retrieves requested performance data from memory accessible to RPM Server SC 260 and returns the requested data over communication link 470 to RPM Client CA 212. RPM Client CA 212 then displays this data to user 115.

At predetermined intervals, explained in greater detail infra, RPM Server SC 260 initiates communication 471, whereby Central Performance Data Server 265 receives control. Responsive to this communication, Central Performance Data Server 265 generates the requested performance data and returns this requested data over communication link 471 to RPM Server SC 260. RPM Server SC 260 retains this performance data in accessible memory to satisfy future requests from any RPM Client within virtual data center complex 400.

Figure 5:
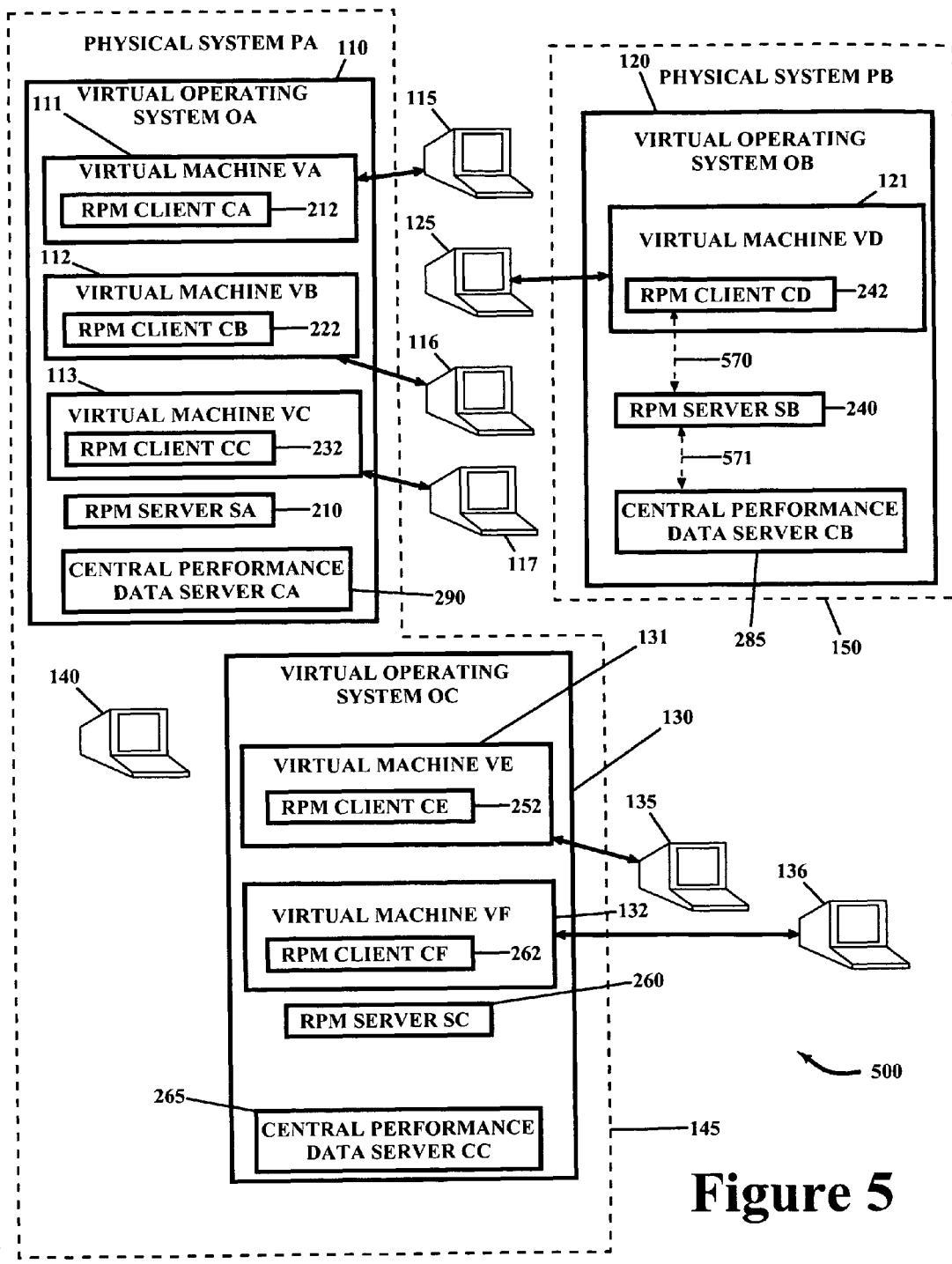
FIG. 5 is a block diagram illustrating a third exemplary performance screen request.

Referring now to FIG. 5, the block diagram of FIG. 2 is further expanded to illustrate a specific example of a user logged onto one virtual machine requesting performance information pertaining to the target virtual operating system that comprises the requesting user's virtual machine. User 125 is logged onto virtual machine VD 121 and requests performance information pertaining to virtual operating system OB 120. For this example VD 121 is referred to as the originating virtual machine and virtual operating system OB 120 is referred to as the target virtual operating system.

Responsive to user 125 initiating this request, RPM Client CD 242 receives control and initiates communication 570, whereby RPM Server SB 240 receives control. Responsive to this communication, RPM Server SB 240 retrieves requested performance data from memory accessible to RPM Server SB 240 and returns the requested data over communication link 570 to RPM Client CD 242. RPM Client CD 242 then displays this data to user 125.

At predetermined intervals, explained in greater detail infra, RPM Server SB 240 initiates communication 571, whereby Central Performance Data Server CB 285 receives control. Responsive to this communication, Central Performance Data Server CB 285 generates the requested performance data and returns the requested data over communication link 571 to RPM Server SB 240. RPM Server SB 240 retains this performance data in accessible memory to satisfy future requests from any RPM Client within virtual data center complex 500.

Figure 6:
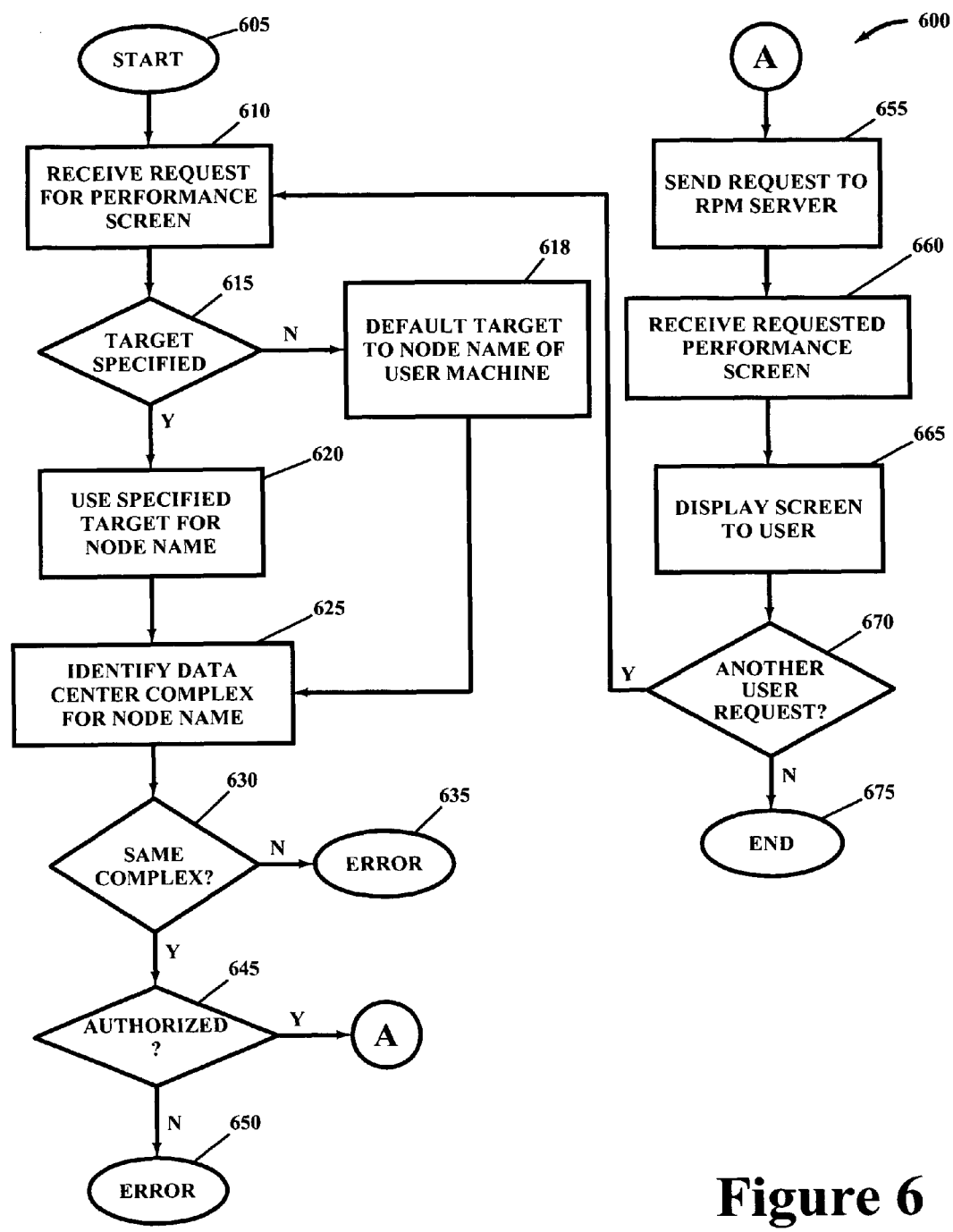
FIG. 6 is a flow diagram illustrating the logic flow of one embodiment of an RPM Client.

Referring now to FIG. 6, flow diagram 600 teaches one embodiment of an RPM Client. Processing begins at step 605 and then, in step 610, a request for a performance screen is received from a user logged on to an originating virtual machine. Continuing with step 615, a test is made to determine if the user request identified a target virtual operating system. If so, in step 620, the node name of the specified target virtual machine is used. Otherwise, if the user request failed to identify a target virtual operating system, then, in step 618, the node name associated with the user's originating virtual machine is defaulted as the target node name.

Continuing from either step 620 or step 618, processing resumes at step 625 where the virtual data center complex associated with the target node name is determined. In step 630, a test is made to determine if the virtual data center complex determined by step 625 is the same as the virtual data center complex associated with the user's originating virtual machine (i.e. the virtual machine that the user is logged onto). If the virtual data complex associated with the user's originating virtual machine is different than the virtual data complex associated with the target virtual machine determined in step 625, then, in step 635, processing concludes with an error condition. Otherwise, processing continues with step 645.

In step 645, a test is made to determine if the user is authorized to retrieve the requested performance screen. If not, processing concludes at step 650 with an error condition. Otherwise, processing continues at step 655 where the performance screen request is sent to the RPM server associated with the target virtual operating system.

Continuing with step 660, the requested performance screen is returned by the RPM server to the RPM client. In step 665, the performance screen is displayed to the user. In an alternative embodiment, performance information exceeding the user's authorization level is expurgated from the performance screen by the RPM client prior to displaying to the user.

If another user request is made for a performance screen, at step 670, processing returns to step 610, explained supra. Otherwise, processing concludes normally at step 675.

Figure 7:
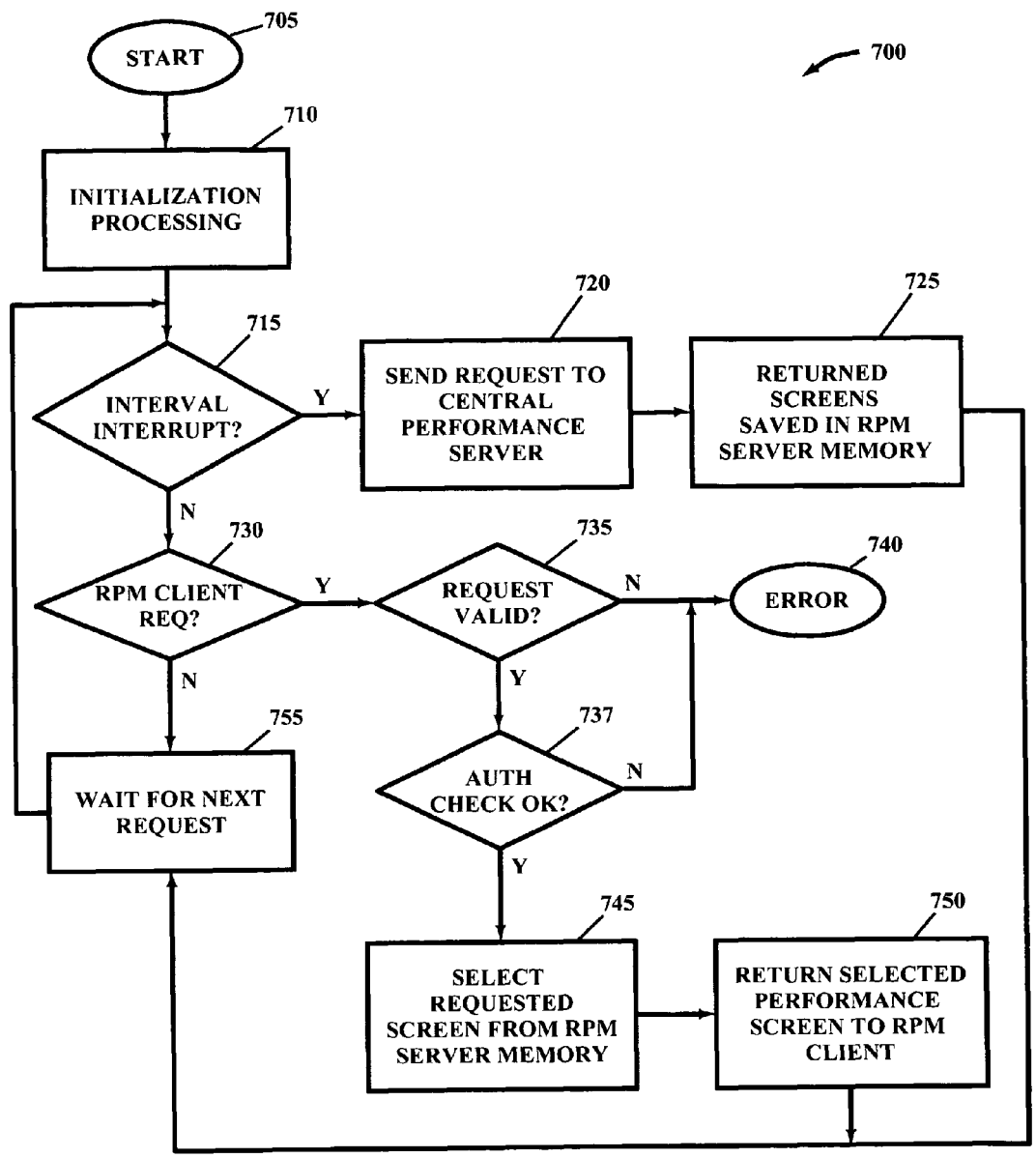
FIG. 7 is a flow diagram illustrating the logic flow of one embodiment of an RPM Server.

Referring now to FIG. 7, flow diagram 700 teaches one embodiment of an RPM Server. Processing begins at step 705 and then, in step 710, initialization processing is performed to establish the presence of the RPM Server in its respective virtual operating system. In step 715 a test is made to determine if an instance of a periodic interval interrupt has occurred. If so, control passes to step 720 where RPM Server sends a request to the Central Performance Data Server operable on the same virtual operating system as the RPM Server. Then, in step 725, the Central Performance Data Server returns the requested performance screens to RPM Server, where they are stored in RPM Server memory for the processing of future RPM Client requests. Processing then continues with step 755, where RPM Server waits for the next work request at which time control returns to step 715 discussed supra.

Returning now to step 715, if the RPM Server request is not an interval interrupt, then processing continues with step 730 where a test is made to determine if this is an RPM Client request. If so, in step 735 an additional test is made to determine if the RPM Client request is valid. If it is not a valid request, processing is abnormally terminated at step 740, otherwise processing continues at step 737 where a test is made to determine if the user is authorized to retrieve the requested performance information. If not, processing abnormally terminates at step 740, otherwise processing continues with step 745. In step 745, the RPM Client requested performance screen is selected from RPM Server memory. Then, at step 750, the requested performance screen selected in step 745, supra, is returned to the RPM Client and processing continues at step 755, discussed supra. Returning now to step 730, if this is not an RPM Client request, then processing proceeds to step 755, discussed supra.

Figure 8:
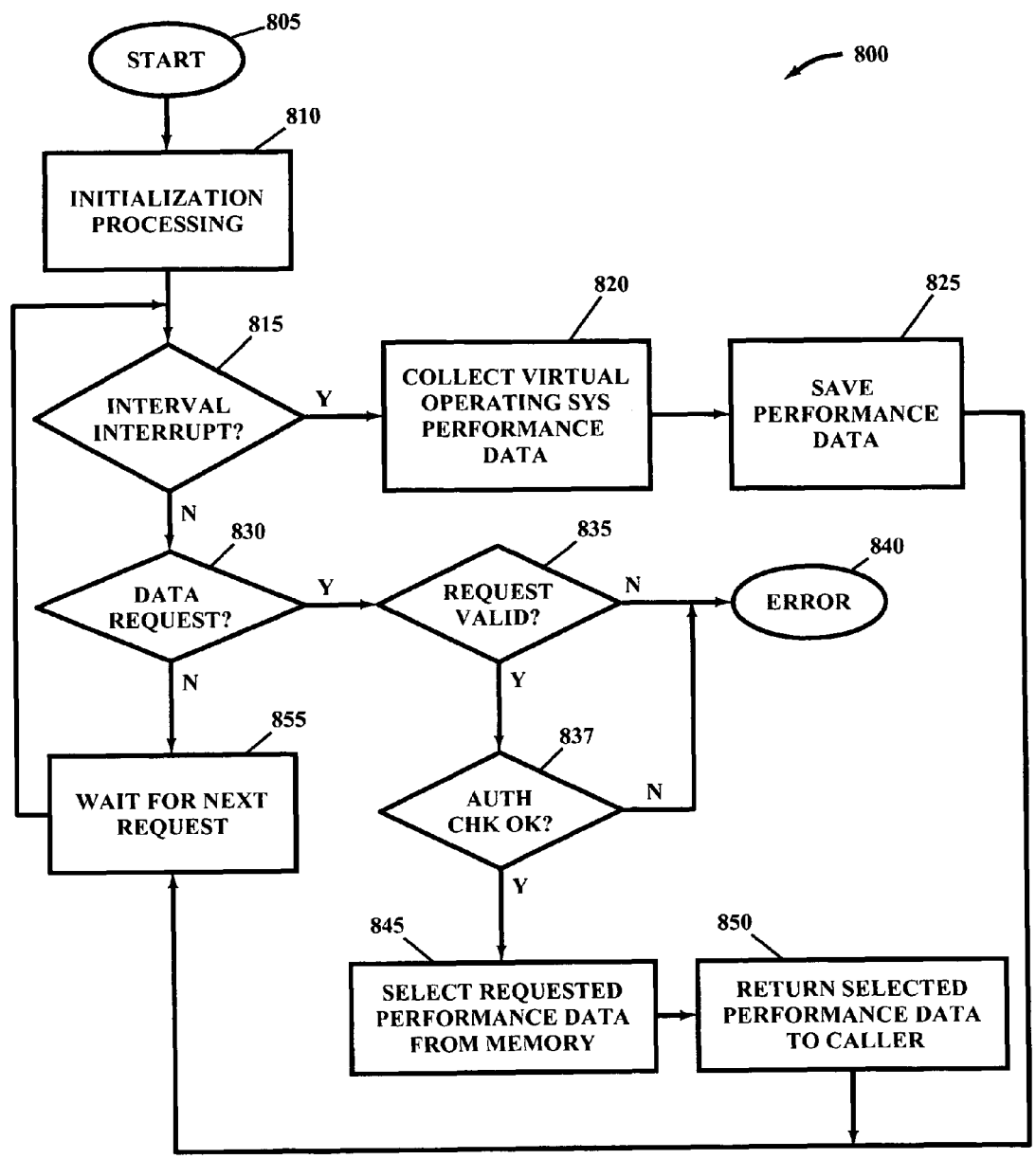
FIG. 8 is a flow diagram illustrating the logic flow of one embodiment of a Central Performance Data Server.

Referring now to FIG. 8, flow diagram 800 teaches one embodiment of a Central Performance Data Server. Processing begins at step 805, and, in step 810, the Central Performance Data Server is started and initialized responsive to an administrator command. In step 815 a test is made to determine if an instance of a periodic interval interrupt has occurred. If so, control passes to step 820 where the Central Performance Data Server collects virtual operating system performance data for the associated virtual operating system. Then, in step 825, the Central Performance Data Server saves this performance data in memory for the processing of future user requests. Processing then continues with step 855, where Central Performance Data Server waits for the next work request at which time control returns to step 815 discussed supra.

Returning now to step 815, if the request is not an interval interrupt, then processing continues with step 830 where a test is made to determine if this is a performance data request from a user of the services of Central Performance Data Server (e.g. an RPM Server). If so, in step 835 an additional test is made to determine if the user request is valid. If it is not a valid request, processing is abnormally terminated at step 840, otherwise processing continues at step 837 where an additional test is made to determine if the user is authorized to retrieve the requested information. If the user is not authorized, processing terminates abnormally at step 840. Otherwise, processing continues with step 845 where the user requested performance data is retrieved from memory accessible to Central Performance Data Server. Then, at step 850, the requested performance data is returned to the user (e.g. RPM Server) who called the Central Performance Data Server service. Following step 850, control passes to step 855 where Central Performance Data Server waits for the next request and then proceeds to step 815, discussed supra. Returning now to step 830, if the request is not a user request for data, control passes to step 855, discussed supra.

Taken in combination, flow diagrams 600, 700 and 800 in conjunction with supporting diagrams and detailed descriptions provide for remotely monitoring the performance of a virtual operating system within a virtual data center complex by logging onto any virtual machine within that virtual data center complex. In accordance with the teaching contained herein, the general user is afforded great flexibility in efficiently acquiring needed performance information in a manner that is safe and non-disruptive to the virtual data center complex.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. §112, sixth paragraph, unless the element is expressly recited using the phrase "means for" or "step for."

While the various embodiments of the present invention has been described in detail, it will be understood that modification and adaptations to the embodiment(s) shown may occur to one of ordinary skill in the art without departing from the spirit and scope of the present invention as set forth in the following claims. Thus, the scope of this invention is to be construed according to the appended claims and not just to the specific details disclosed in the exemplary embodiments.

What is claimed is:

1. A computer-implemented method, comprising:
    logically partitioning a physical computing system into at least one virtual computing system;
    executing a virtual operating system in the at least one virtual computing system;
    executing a plurality of virtual machines in the virtual operating system, the plurality of virtual machines including a first virtual machine and a second virtual machine;
    executing a central performance data server in the virtual operating system, the central performance data server to collect and store performance data of each of the plurality of virtual machines executing in the virtual operating system, wherein the performance data is collected at predefined intervals;
    executing a remote performance monitoring server in the virtual operating system, the remote performance monitoring server to respond to requests for the performance data of one of the plurality of virtual machines executing in the virtual operating system;
    receiving, at a remote performance monitoring client executing in the first virtual machine, a request from a user for the performance data of the second virtual machine;
    sending the request from the remote performance monitoring client to the remote performance monitoring server, wherein the remote performance monitoring server retrieves the requested performance data and sends the requested performance data to the remote performance monitoring client;
    receiving the requested performance data at the remote performance monitoring client from the remote performance monitoring server; and
    displaying at least a portion of the requested performance data based on an authorization level associated with the request, wherein the portion of the requested performance data is displayed by the remote performance monitoring client to the user.

2. The computer-implemented method of claim 1, wherein the physical computing system is one of a plurality of physical computing systems at a data center.

3. The computer-implemented method of claim 2, further comprising executing a third virtual machine at a second physical computing system of the plurality of physical computing systems of the data center.

4. The computer-implemented method of claim 3, further comprising receiving, at the remote performance monitoring client executing in the first virtual machine, a second request from the user for the performance data of the third virtual machine.

5. The computer-implemented method of claim 1, wherein retrieving the requested performance data comprises:
   in response to determining that the requested performance data is stored at a memory that is accessible to the remote performance monitoring server and the predefined interval has not passed, the remote performance monitoring server retrieves the requested performance data from the memory;
   in response to determining that the requested performance data is stored at the memory and the predefined interval has passed, the remote performance monitoring server retrieves updated performance data from the central performance data server and replaces the requested performance data at the memory with the updated performance data; and
   in response to determining that the requested performance data is not stored at the memory, the remote performance monitoring server retrieves the updated performance data from the central performance data server and replaces the second performance data at the memory with the updated performance data.

6. The computer-implemented method of claim 1, further comprising:
   in response to receiving the request, authenticating credentials associated with the request when the requested performance data requires authentication,
   wherein the request is sent to the remote performance monitoring server when the credentials are authenticated.

7. The computer-implemented method of claim 6, further comprising displaying an unauthorized usage error message when the credentials are not authenticated.

8. The computer-implemented method of claim 6, wherein the request is sent to the remote performance monitoring server without authenticating the request when the requested performance data does not require authentication.

9. The computer-implemented method of claim 8, wherein the performance data that does not require authentication includes information associated with logical partitions executing in the second virtual machine.

10. The computer-implemented method of claim 8, wherein the performance data that does not require authentication includes system statistics associated with the second virtual machine.

11. The computer-implemented method of claim 8, wherein the performance data that does not require authentication includes resource usage statistics associated with the second virtual machine.

12. The computer-implemented method of claim 8, wherein the performance data that does not require authentication includes memory usage statistics associated with the second virtual machine.

13. The computer-implemented method of claim 8, wherein the performance data that does not require authentication includes channel usage statistics associated with the second virtual machine.

14. The computer-implemented method of claim 8, wherein the performance data that requires authentication includes control unit information associated with the second virtual machine.

15. The computer-implemented method of claim 8, wherein the performance data that requires authentication includes paging information associated with the second virtual machine.

16. A system, comprising:
   a physical computing system that is logically partitioned into at least one virtual computing system;
   a virtual operating system executing in the at least one virtual computing system;
   a plurality of virtual machines executing in the virtual operating system, the plurality of virtual machines including a first virtual machine and a second virtual machine;
   a central performance data server executing in the virtual operating system, the central performance data server to collect and store performance data of each of the plurality of virtual machines executing in the virtual operating system, wherein the performance data is collected at predefined intervals;
   a remote performance monitoring server executing in the virtual operating system, the remote performance monitoring server to respond to requests for the performance data of at least one of the plurality of virtual machines; and
   a remote performance monitoring client executing in the first virtual machine, the remote performance monitoring client to receive a request from a user to retrieve the performance data of the second virtual machine, to send the request from the remote performance monitoring client to the remote performance monitoring server to retrieve the requested performance data, to receive the requested performance from the remote performance monitoring server, and to display at least a portion of the requested performance data based on an authorization level associated with the request wherein the portion of the requested performance data is displayed by the remote performance monitoring client to the user.

17. The system of claim 16, wherein the physical computing system is one of a plurality of physical computing systems at a data center.

18. The system of claim 17, further comprising a third virtual machine executing at a second physical computing system of the plurality of physical computing systems of the data center.

19. The system of claim 18, further comprising receiving, at the remote performance monitoring client executing in the first virtual machine, a request from a user for the performance data of the third virtual machine.

20. The system of claim 16, wherein retrieving the performance data of the second virtual machine further comprises:
   in response to determining that the requested performance data is stored at a memory that is accessible to the remote performance monitoring server and the predefined interval has not passed, the remote performance monitoring server retrieves the requested performance data from the memory;
   in response to determining that the requested performance data is stored at the memory and the predefined interval has passed, the remote performance monitoring server retrieves updated performance data from the central performance data server and replaces the requested performance data at the memory with the updated performance data; and
   in response to determining that the requested performance data is not stored at the memory, the remote performance monitoring server retrieves the updated performance data from the central performance data server and replaces the second performance data at the memory with the updated performance data.

21. The system of claim 16, wherein, in response to receiving the request, the first virtual machine is further operable to authenticate credentials associated with the request when the requested performance data requires authentication and to send the request to the remote performance server when the credentials are authenticated.

22. The system of claim 21, wherein the first virtual machine is further operable to display an unauthorized usage error message when the credentials are not authenticated.

23. The system of claim 21, wherein the request is sent to the remote performance monitoring server without authenticating the request when the requested performance data does not require authentication.

24. The system of claim 23, wherein the performance data that does not require authentication includes information associated with logical partitions executing in the second virtual machine.

25. The system of claim 23, wherein the performance data that does not require authentication includes system statistics associated with the second virtual machine.

26. The system of claim 23, wherein the performance data that does not require authentication includes resource usage statistics associated with the second virtual machine.

27. The system of claim 23, wherein the performance data that does not require authentication includes memory usage statistics associated with the second virtual machine.

28. The system of claim 23, wherein the performance data that does not require authentication includes channel usage statistics associated with the second virtual machine.

29. The system of claim 23, wherein the performance data that requires authentication includes control unit information associated with the second virtual machine.

30. The system of claim 23, wherein the performance data that requires authentication includes paging information associated with the second virtual machine.

31. A non-transitory computer-readable storage medium comprising operational instructions, that when executed by a processor, cause the processor to:
    logically partitioning a physical computing system into at least one virtual computing system;
    execute a virtual operating system in the at least one virtual computing system;
    execute a plurality of virtual machines in the virtual operating system, the plurality of virtual machines including a first virtual machine and a second virtual machine;
    execute a central performance data server in the virtual operating system, the central performance data server to collect and store performance data of each of the plurality of virtual machines executing in the virtual operating system, wherein the performance data is collected at predefined intervals;
    execute a remote performance monitoring server in the virtual operating system, the remote performance monitoring server to respond to requests for the performance data of one of the plurality of virtual machines executing in the virtual operating system;
    receive, at a remote performance monitoring client executing in the first virtual machine, a request from a user for the performance data of the second virtual machine;
    send the request from the remote performance monitoring client to the remote performance monitoring server, wherein the remote performance monitoring server retrieves the requested performance data and sends the requested performance data to the performance monitoring client;
    receive the requested performance data at the remote performance monitoring client from the remote performance monitoring server; and
    display at least a portion of the requested performance data based on an authorization level associated with the request wherein the portion of the requested performance data is displayed by the remote performance monitoring client to the user.

32. The non-transitory computer-readable storage medium of claim 31, wherein the physical computing system is one of a plurality of physical computing systems at a data center.

33. The non-transitory computer-readable storage medium of claim 32, wherein the instructions are further executable by the processor to execute a third virtual machine at a second physical computing system of the plurality of physical computing systems of the data center.

34. The non-transitory computer-readable storage medium of claim 33, wherein the instructions are further executable by the processor to receive, at the remote performance monitoring client executing in the first virtual machine, a second request from the user for the performance data of the third virtual machine.

35. The non-transitory computer-readable storage medium of claim 31, wherein the instructions to retrieve the performance data of the second virtual machine are further executable by the processor to:
    in response to determining that the requested performance data is stored at a memory that is accessible to the remote performance monitoring server and the predefined interval has not passed, cause the remote performance monitoring server to retrieve the requested performance data from the memory;
    in response to determining that the requested performance data is stored at the memory and the predefined interval has passed, cause the remote performance monitoring server to retrieve updated performance data from the central performance data server and replace the requested performance data at the memory with the updated performance data; and
    in response to determining that the requested performance data is not stored at the memory, cause the remote performance monitoring server to retrieve the updated performance data from the central performance data server and replace the updated performance data at the memory with the second performance data.

36. The non-transitory computer-readable storage medium of claim 31, wherein the instructions are further executable by the processor to authenticate credentials associated with the request when the requested performance data requires authentication and send the request to the remote performance server when the credentials are authenticated.

37. The non-transitory computer-readable storage medium of claim 36, wherein the instructions are further executable by the processor to display an unauthorized usage error message when the credentials are not authenticated.

38. The non-transitory computer-readable storage medium of claim 36, wherein the request is sent to the remote performance monitoring server without authenticating the request when the requested performance data does not require authentication.

39. The non-transitory computer-readable storage medium of claim 38, wherein the performance data that does not require authentication includes information associated with logical partitions executing in the second virtual machine.

40. The non-transitory computer-readable storage medium of claim 38, wherein the performance data that does not require authentication includes system statistics associated with the second virtual machine.

41. The non-transitory computer-readable storage medium of claim 38, wherein the performance data that does not require authentication includes resource usage statistics associated with the second virtual machine.

42. The non-transitory computer-readable storage medium of claim 38, wherein the performance data that does not require authentication includes memory usage statistics associated with the second virtual machine.

43. The non-transitory computer-readable storage medium of claim 38, wherein the performance data that does not require authentication includes channel usage statistics associated with the second virtual machine.

44. The non-transitory computer-readable storage medium of claim 38, wherein the performance data that requires authentication includes control unit information associated with the second virtual machine.

45. The non-transitory computer-readable storage medium of claim 38, wherein the performance data that requires authentication includes paging information associated with the second virtual machine.

* * * * *